United States Patent
Cha et al.

(10) Patent No.: US 9,716,867 B2
(45) Date of Patent: Jul. 25, 2017

(54) COLOR FILTER ARRAY AND IMAGE SENSOR HAVING THE SAME

(71) Applicant: SK hynix Inc., Gyeonggi-do (KR)

(72) Inventors: Su-Ram Cha, Gyeonggi-do (KR); Jong-Suk Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 56 days.

(21) Appl. No.: 14/661,924

(22) Filed: Mar. 18, 2015

(65) Prior Publication Data
US 2016/0173835 A1 Jun. 16, 2016

(30) Foreign Application Priority Data

Dec. 15, 2014 (KR) .................. 10-2014-0180215

(51) Int. Cl.
  *H04N 9/04* (2006.01)
  *H04N 5/369* (2011.01)
  *H04N 5/359* (2011.01)

(52) U.S. Cl.
  CPC ............ *H04N 9/045* (2013.01); *H04N 5/359* (2013.01); *H04N 5/3696* (2013.01); *H04N 2209/045* (2013.01)

(58) Field of Classification Search
  CPC .... H04N 5/2173; H04N 5/359; H04N 5/3696; H04N 9/045; H04N 9/093; H04N 9/646; H04N 1/58; H04N 1/60; H01L 27/14603; H01L 27/14621
  See application file for complete search history.

(56) References Cited

U.S. PATENT DOCUMENTS

| | | | |
|---|---|---|---|
| 8,436,925 B2 | 5/2013 | Hirota | |
| 8,446,497 B2 | 5/2013 | Hu | |
| 2009/0115882 A1* | 5/2009 | Kawarada | G03B 7/28 348/340 |
| 2009/0128671 A1* | 5/2009 | Kusaka | H04N 5/23212 348/246 |
| 2011/0273608 A1* | 11/2011 | Tsukada | G02B 7/36 348/345 |
| 2012/0098975 A1* | 4/2012 | Chao | H04N 5/3572 348/187 |
| 2013/0155271 A1* | 6/2013 | Ishii | H04N 5/23212 348/222.1 |
| 2013/0242148 A1 | 9/2013 | Mlinar et al. | |
| 2014/0078349 A1* | 3/2014 | Velichko | H04N 5/359 348/241 |

(Continued)

FOREIGN PATENT DOCUMENTS

KR  100808494  2/2008

*Primary Examiner* — Dennis Hogue
(74) *Attorney, Agent, or Firm* — IP & T Group LLP

(57) ABSTRACT

A color filter array includes a plurality of first pixels transmitting light having visible wavelengths, a plurality of second pixels transmitting light having a first range of wavelengths in the visible spectrum, a plurality of third pixels transmitting light having a second range of wavelengths in the visible spectrum, and a plurality of crosstalk detection pixels each including a first half pixel and a second half pixel, wherein the first half pixel transmits light having first wavelengths in a part of the first range, and wherein the second half pixel partially transmits light having second wavelengths in a part of the second range.

18 Claims, 4 Drawing Sheets

(56) References Cited

U.S. PATENT DOCUMENTS

2014/0347533 A1* 11/2014 Toyoda .................. H04N 9/045
    348/294
2015/0002634 A1* 1/2015 Ishiga ................ H04N 13/0257
    348/46

* cited by examiner

COLOR FILTER ARRAY AND IMAGE SENSOR HAVING THE SAME

CROSS-REFERENCE TO RELATED APPLICATIONS

The present document claims priority of Korean Patent Application No. 10-2014-0180215, entitled "COLOR FILTER ARRAY AND IMAGE SENSOR HAVING THE SAME" and filed on Dec. 15, 2014, which is incorporated herein by reference in its entirety.

BACKGROUND

Exemplary embodiments of the present invention relate to a semiconductor device and, more particularly, to a color filter array and an image sensor including the color filter array.

An image sensor converts an optical image into electric signals and employs a color filter array to reproduce color images. The color filter array is located over a photoelectric device and may be a mosaic filter, which lets light with specific wavelength bands pass through.

A typical color filter array has a Bayer pattern. The Bayer pattern has a 2×2 matrix structure. R and G pixels (RG) and G and B pixels (GB) are arranged in a 2×2 matrix. In the Bayer pattern, RG/GB pixels are repeated.

The Bayer pattern may reproduce original colors without additional processing and thus is advantageous in generating rich colors. However, the Bayer pattern is disadvantageous in that light loss is significant, resulting in decreased sensitivity. In addition, since RG/GB pixels are repeated, crosstalk between pixels may be severe, leading to a lack of color reproducibility.

SUMMARY

Various embodiments are directed to a color filter array capable of improving sensitivity and color reproducibility and an image sensor employing the color filter array.

In an embodiment, a color filter array may include: a plurality of first pixels suitable for transmitting light having visible wavelengths; a plurality of second pixels suitable for transmitting light having a first range of wavelengths in the visible spectrum; a plurality of third pixels suitable for transmitting light having a second range of wavelengths in the visible spectrum; and a plurality of crosstalk detection pixels each including a first half pixel and a second half pixel, wherein the first half pixel transmits light having first wavelengths that are within the first range, and wherein the second half pixel transmits light having second wavelengths that are within the second range.

Each of the plurality of crosstalk detection pixels may be located adjacent to at least two of the plurality of first pixels, at least two of the plurality of second pixels, and at least two of the plurality of third pixels. The first wavelengths may have a range corresponding to an edge of the first range, and the second wavelengths may have a range corresponding to an edge of the second range. The first half pixel may have high spectral sensitivity correlation with the plurality of second pixels, and the second half pixel may have high spectral sensitivity with correlation with the plurality of third pixels. The plurality of first pixels may be arranged in a checkerboard pattern. Each of the plurality of crosstalk detection pixels may be arranged in a same row and column as the plurality of first pixels. Each of the plurality of crosstalk detection pixels may be arranged in a different row and column from the plurality of first pixels. The sum of the plurality of first pixels and the plurality of crosstalk detection pixels may be 40-60% of a total number of pixels. The total number of the plurality of first pixels may be the same as or greater than the total number of the plurality of crosstalk detection pixels. The plurality of first pixels and the plurality of crosstalk detection pixels may be arranged in a given region, and the plurality of second pixels and the plurality of third pixels may be randomly arranged in a region which is not occupied by the plurality of first pixels and the plurality of crosstalk detection pixels. The total number of the plurality of second pixels may be substantially the same as the total number of the plurality of third pixels. Each of the plurality of second pixels and the plurality of third pixels may include at least one selected from the group consisting of a red pixel, a green pixel, a blue pixel, a cyan pixel, a yellow pixel, and a magenta pixel. The plurality of second pixels and the plurality of third pixels may be lowest in spectral sensitivity correlation. The plurality of first pixels may include a white pixel or a transparent pixel the plurality of second pixels and the plurality of third pixels may include a blue pixel and a red pixel, respectively, and the first half pixel and the second half pixel may include a cyan pixel and a yellow pixel, respectively.

The color filter array may comprise a plurality of subarrays having a 3×3 matrix structure and including the respective crosstalk detection pixels in a center thereof.

The plurality of subarrays may each include the plurality of first pixels, the plurality of second pixels, the plurality of third pixels, and the crosstalk detection pixel at a ratio of 4:2:2:1. The plurality of subarrays may partially shares with each other the first, the second, and the third pixels. The subarray may include the first pixels at four corners thereof and includes the second and third pixels at a top and a bottom of the crosstalk detection pixel and at both sides of the crosstalk detection pixel, respectively. The first and second half pixels may be approximately half of a size of the first to third pixels.

In an embodiment, an image sensor may include: a color filter array; and a photoelectric conversion layer formed under or over the color filter array, wherein the color filter array may include: a plurality of first pixels suitable for transmitting light having visible wavelengths; a plurality of second pixels suitable for transmitting light having a first range of wavelengths in the visible spectrum; a plurality of third pixels suitable for transmitting light having a second range of wavelengths in the visible spectrum; and a plurality of crosstalk detection pixels each including a first half pixel and a second half pixel, wherein the first half pixel transmits light having first wavelengths in a part of the first range, wherein the second half pixel transmits light having second wavelengths in a part of the second range.

DETAILED DESCRIPTION

Figure 1:
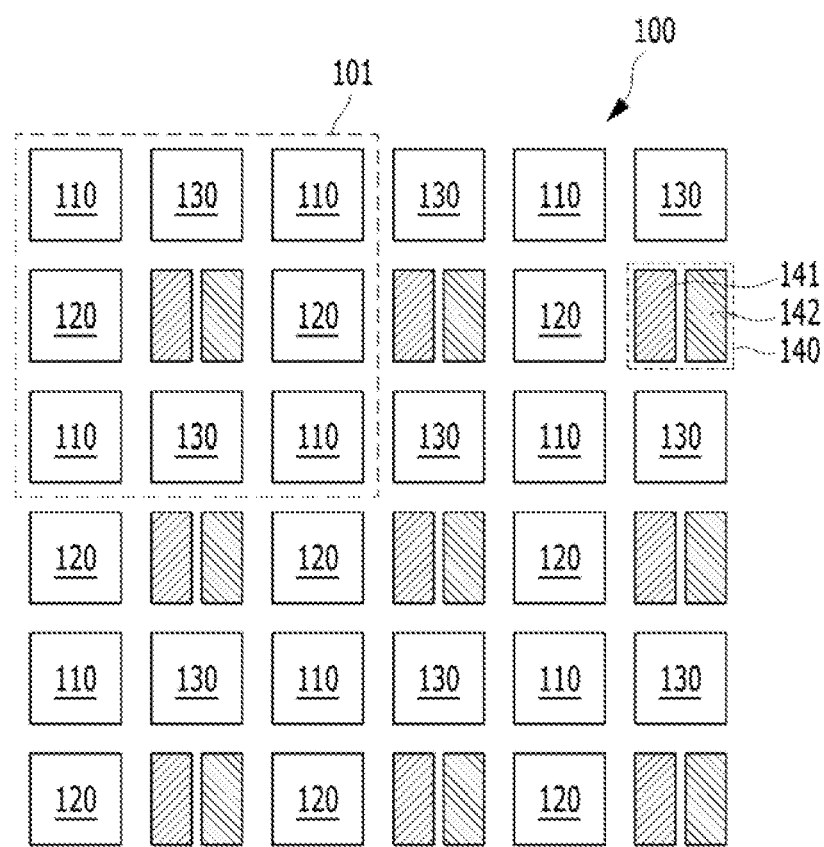
FIG. 1 shows a color filter array according to an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When a first layer is referred to as being "on" a second layer or "on" a substrate, it not only refers to where the first layer is formed directly on the second layer or the substrate but also to where a third layer exists between the first layer and the second layer or the substrate.

An embodiment provides a color filter array capable of improving sensitivity and color reproducibility and an image sensor employing the color filter array. The color filter array according to an embodiment may include white pixels (or transparent pixels) and a crosstalk detection pixel to prevent sensitivity deterioration due to light loss and improve color reproducibility in interpolation processing. Crosstalk information may be obtained from the crosstalk detection pixel. In addition, the crosstalk information obtained from the crosstalk detection pixels may contribute to accuracy in image processing, for example, auto white balance, lens shading correction, etc.

FIG. 1 shows a color filter array according to an embodiments. As shown in FIG. 1, a color filter array 100 according to an embodiment may include a plurality of first pixels 110, a plurality of second pixels 120, a plurality of third pixels 130, and a plurality of crosstalk detection pixels 140. The plurality of first pixels 110 transmit light having wavelengths in the visible spectrum (i.e., visible wavelengths). The plurality of second pixels 120 transmit light having a first range of wavelengths in the visible spectrum. The plurality of third pixels 130 transmit light having a second range of wavelengths in the visible spectrum. The plurality of crosstalk detection pixels 140 each includes a first half pixel 141 and a second half pixel 142. The first half pixel 141 transmits light having wavelengths in a part of the first range. The second half pixel 142 transmits light having wavelengths in a part of the second range. Each of the plurality of crosstalk detection pixels 140 is located adjacent to at least two of the plurality of first pixels 110, at least two of the plurality of second pixels 120, and at least two of the plurality of third pixels 130.

Each of the first half pixel 141 and the second half pixel 142 may be half of the size of the first pixel 110 or half of the size of the second pixel 120. The crosstalk detection pixel 140, which includes the first half pixel 141 and the second half pixel 142, may be the same size as the first pixel 110 or the second pixel 120.

The first half pixel transmits light having wavelengths corresponding to an edge of the first range, and the second half pixel transmits light having wavelengths corresponding to an edge of the second region. This may mean that the first half pixel has great correlation of spectral sensitivity with the plurality of second pixels and the second half pixel has great correlation of spectral sensitivity with the plurality of third pixels.

Great correlation of spectral sensitivity may mean that wavelengths corresponding to two given pixels have a small wavelength range therebetween and are not significantly different from each other. For example, when the second pixel 120 and the third pixel 130 are respectively a blue pixel and a red pixel, the first half pixel 141 may be a cyan pixel which has great correlation of spectral sensitivity with the blue pixel and the second half pixel 142 may be a yellow pixel which has great correlation of spectral sensitivity with the red pixel.

Each of the plurality of crosstalk detection pixels 140 may be arranged in a different row and column from the plurality of first pixels 110. In this case, the plurality of crosstalk detection pixels 140 and the plurality of first pixels 110 may be arranged in a diagonal direction and in an alternate manner.

In another embodiment, each of the plurality of crosstalk detection pixels 140 may be arranged in the same row and column as the plurality of first pixels 110. Each of the plurality of crosstalk detection pixels 140 may be surrounded by the plurality of first pixels 110. This arrangement may contribute to improving color reproducibility at post-processing, e.g., interpolation processing, of the plurality of crosstalk detection pixels 140.

The plurality of first pixels 110, which transmit light having the visible wavelengths (i.e., visible light), may serve to prevent sensitivity deterioration due to light loss and obtain color information on wavelengths corresponding to a third range, which is the remaining range, excluding the first and the second ranges from the visible spectrum. The plurality of first pixels 110 may be white pixels.

In another embodiment, the plurality of first pixels 110 may be transparent pixels, which transmit infrared light having longer wavelengths than those of visible light, in addition to the visible light. In this case, information on infrared light and distance may be obtained as well as the color information.

The plurality of first pixels 110 may be arranged in a checkerboard pattern. The sum of the plurality of first pixels 110 and the plurality of crosstalk detection pixels 140 is about 50% of the total number of pixels. For example, it may be 40-60% of the total number of pixels.

When the sum of the plurality of first pixels 110 and the plurality of crosstalk detection pixels 140 is less than 40%, it would be difficult to compensate sensitivity deterioration due to light loss. When the sum of the plurality of first pixels 110 and the plurality of crosstalk detection pixels 140 is more than 60%, color reproducibility may deteriorate. The total number of the plurality of first pixels 110 is the same as or more than the total number of the plurality of crosstalk detection pixels 140. When the total number of the plurality of crosstalk detection pixels 140 is more than the total number of the plurality of first pixels 110, post-processing, e.g., interpolation processing, may be difficult to perform or more time may be required to complete the post-processing.

The plurality of second pixels 120 and the plurality of third pixels 130 may serve to obtain color information. The plurality of first pixels 110 and the plurality of crosstalk detection pixels 140 may be arranged first. Then, the plurality of second pixels 120 and the plurality of third pixels 130 may be randomly arranged in the remaining region which is not occupied by the plurality of first pixels 110 and the plurality of crosstalk detection pixels 140.

Each of the plurality of second pixels 120 and the plurality of third pixels 130 may include any one selected form the group consisting of a red pixel, a green pixel, a blue pixel, a cyan pixel, a yellow pixel, a magenta pixel. The plurality of second pixels 120 may have the lowest correlation of spectral sensitivity with the plurality of third pixels 130. Low correlation of spectral sensitivity may mean that the wavelengths of the first range, corresponding to the second pixels 120, and the wavelengths of the second range, corresponding to the third pixels 130, have a wide wavelength range therebetween and are significantly different from each other.

For example, when the second pixels 120 are blue pixels, the third pixels 130 are red pixels. This may contribute to high quality of color information obtained through interpolation processing and improved color reproducibility.

A color filter array 100 according to an embodiment may include a plurality of subarrays 101 having a 3×3 matrix structure. The plurality of subarrays 101 may be arranged randomly in the color filter array 100. Each subarray 101 may include a crosstalk detection pixel 140 located in the center and a plurality of first pixels 110, a plurality of second pixels 120, and a plurality of third pixels 130 arranged to surround the crosstalk detection pixel 140. The plurality of second pixels 120 and the plurality of third pixels 130 may be located between the first pixels 110.

For example, the first pixel 110 the second pixel 120, the first pixel 110, and the third pixel 130 are sequentially arranged in a clockwise direction and surround the crosstalk detection pixel 140. In a given subarray 101, the ratio, in terms of the total number, of the plurality of first pixels 110: the plurality of second pixels 120: the plurality of third pixels 130: the crosstalk detection pixel 140 may be 4:2:2:1. The plurality of subarrays 101 may partially share with each other the first, the second, and the third pixels. The subarray 101 may serve as a basic unit in image processing, e.g., the interpolation processing.

Since a color filter array 100 according to an embodiment includes the plurality of first pixels 110 and the plurality of crosstalk detection pixels 140, it may prevent sensitivity deterioration due to light loss and improve color reproducibility.

Figure 2:
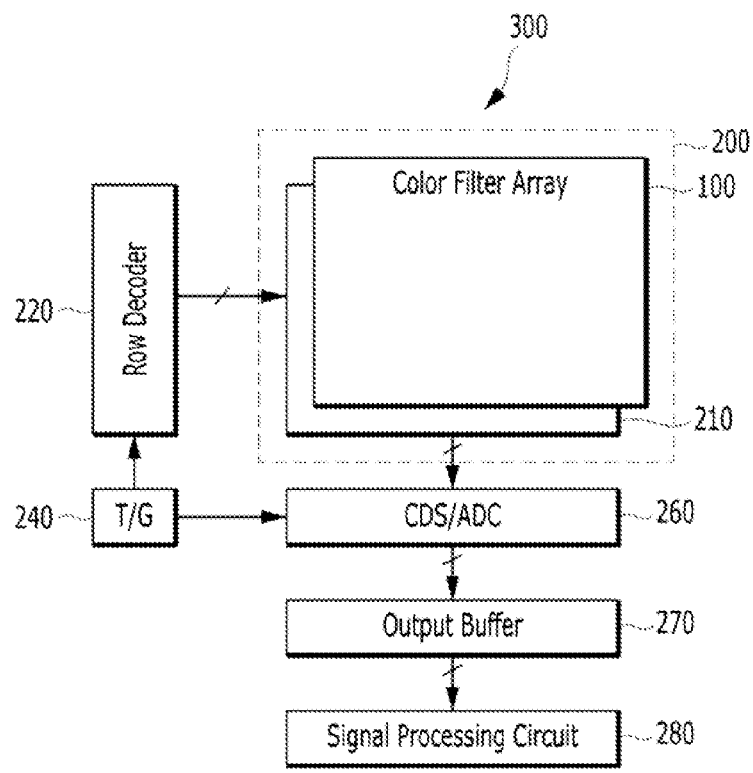
FIG. 2 shows an image sensor including a color filter array according to an embodiment.
Figure 3:
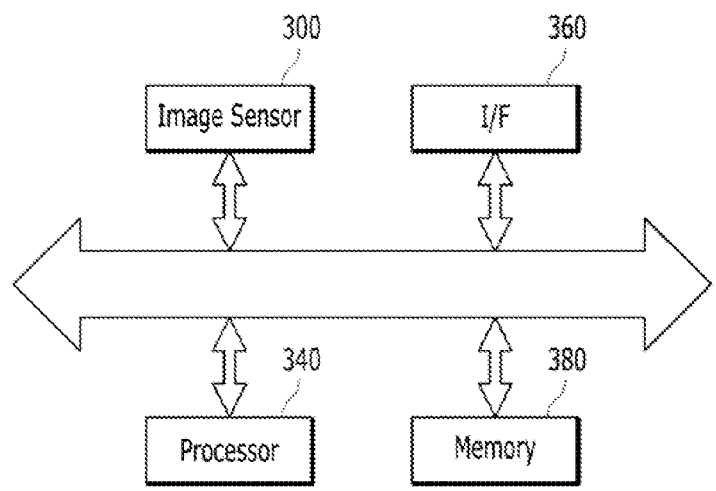
FIG. 3 shows an image processing device including the image sensor shown in FIG. 2.

FIG. 2 shows an image sensor including a color filter array according to an embodiment. FIG. 3 shows an image processing device including the image sensor shown in FIG. 2.

As shown in FIGS. 2 and 3, the sensor image 300 may include a pixel array 200, a row decoder 220, a timing generator 240, and a CDS/ADC circuit 260.

The pixel array 200 may include a color filter array 100 according to an embodiment and a photoelectric conversion layer 210. The photoelectric conversion layer 210 is formed under the color filter array 100 and includes a plurality of photoelectric conversion elements which correspond to respective pixels of the color filter array 100. The photoelectric conversion element corresponding to the first half pixel 141 or the second half pixel 142 may have a smaller size than the photoelectric conversion element corresponding to the first pixel 110, the second pixel 120, or the third pixel 130.

The pixel array 200 may include a plurality of pixels outputting color information of incident light. Each of the plurality of pixels may output a pixel signal corresponding to incident light which passes through each filter of the color filter array 100. The photoelectric conversion element may include a photodiode.

The row decoder 220 may select a specific row among a plurality of rows in response to an address signal and a control signal which are transmitted from the timing generator 240.

The CDS/ADC circuit 260 performs correlated double sampling (CDS) with respect to signals outputted from the pixel array 200 in response to the control signal outputted from the timing generator 240 to generate CDS signals, subjects the CDS signals to analog-digital conversion, and outputs the converted digital signals. The respective digital signals may correspond to the intensity of the incident light which passes through corresponding filters of the color filter array 100.

In addition, the image sensor 300 may further include an output buffer 270 and a signal processing circuit 280. The signal processing circuit 280 may be integrated as part of a processor of an image processing system, e.g., as shown in FIG. 3.

The signal processing circuit 280 may generate image information and depth information based on a plurality of pixel signals or a plurality of digital signals. The output buffer 270 may include a plurality of buffers which store the digital signals outputted from the CDS/ADC circuit 260. The output buffer 270 may output the digital signals to the signal processing circuit 280. In another embodiment, the output buffer 270 may be omitted.

The image processing system according to an embodiment may include a digital camera, a cellular phone having an embedded digital camera, or any electronic device including a digital camera. The image processing system may process two-dimensional image information or three-dimensional image information. The image processing system may include the image sensor 300 according to an embodiment and a processor 4 which controls operation of the image sensor 300.

The image processing system according to an embodiment may further include an interface I/F 360 and a memory 380. The interface 360 may be a video display device or an input/output device. The memory 380 may store information provided from the image sensor 300 and information obtained by processing the information provided from the image sensor 300 under the control of the processor 340.

Figure 4A:
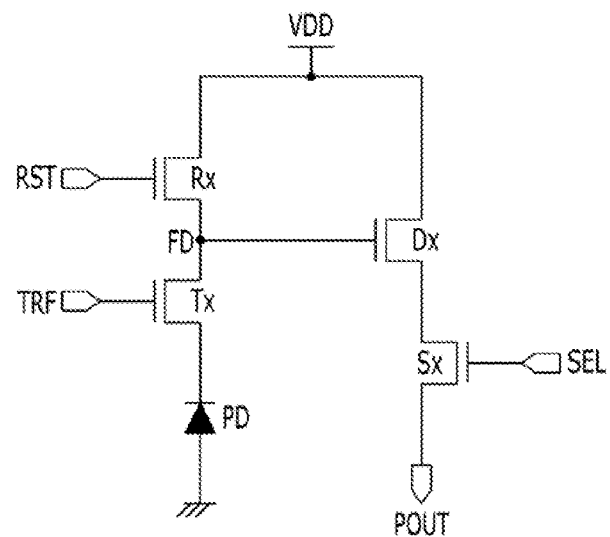
FIGS. 4A and 4B show equivalent circuits of respective pixels, which output pixel signals, arranged in a pixel array of an image sensor according to an embodiment.
Figure 4B:
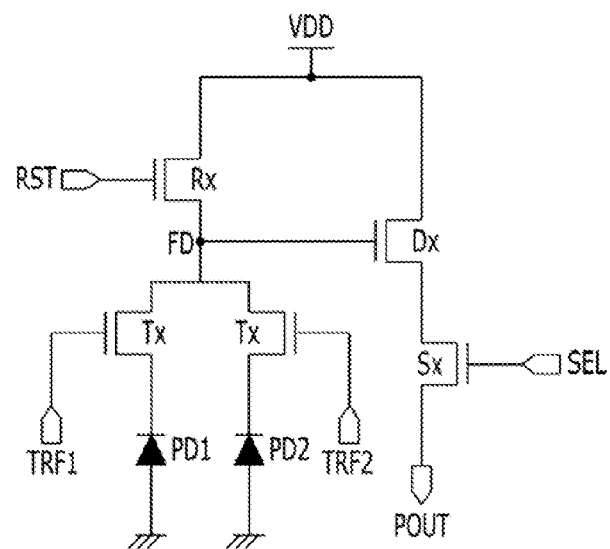

FIGS. 4A and 4B show equivalent circuits of respective pixels, which output pixel signals, arranged in a pixel array of an image sensor according to an embodiment. Specifically, FIG. 4A shows an equivalent circuit of the first, the second, and the third pixels. FIG. 4B shows an equivalent circuit of the crosstalk detection pixel.

As shown in FIG. 4A, the first, the second, and the third pixels may include a photoelectric conversion element PD, a transfer transistor Tx, a reset transistor Rx, a drive transistor Dx, and a selection transistor Sx. For reference, the drive transistor Dx may also be referred to as the 'Source Follower transistor.'

The photoelectric conversion element PD may be a photodiode. An end of the photoelectric conversion element PD may be connected to ground voltage. An end (e.g., source) of the transfer transistor Tx, which operates in response to a transfer signal TRF, is connected to the photoelectric conversion element PD. The other end (e.g., drain) of the transfer transistor Tx is connected to a floating diffusion node D. The floating diffusion node FD may be connected to an end of the reset transistor Rx which operates in response to a reset signal RST. The other end of the reset transistor Rx may be connected to a power voltage node VDD. An end of the drive transistor Dx may be connected to the power voltage node VDD, as well.

A drive gate of the drive transistor Dx may be connected to the floating diffusion node FD. The other end of the drive transistor Dx may be connected to an end of the selection transistor Sx which operates in response to a selection signal SEL. A pixel signal POUT may be outputted from the other end of the selection transistor Sx.

As shown in FIG. 4B, the crosstalk detection pixel is basically the same as the first, the second, and the third pixels. However, the crosstalk detection pixel is different from them in that the crosstalk detection pixel includes two photoelectric conversion elements PD1 and PD2 and two transfer transistors Tx which respectively correspond to the first half pixel and the second half pixel. Each of the photoelectric conversion elements PD1 and PD2, which respectively correspond to the first half pixel and the second half pixel, may be a half of the size of the photoelectric conversion element PD corresponding to the first, the second, or the third pixel.

The two transfer transistors Tx may independently operate in response to first transfer signal TRF1 and second transfer signal TRF2, respectively. Photons generated from the photoelectric conversion element PD1 corresponding to the first half pixel may be transferred to the floating diffusion node FD in response to the first transfer signal TRF1. Likewise, photons generated from the photoelectric conversion element PD2 corresponding to the second half pixel may be transferred to the floating diffusion node FD in response to the second transfer signal TRF2.

Hereinafter, a method for obtaining color information from a color filter array according to an embodiment and an image sensor having the color filter array, which are shown in FIGS. 1 to 4, will be described in detail. In this simplified embodiment, the first pixel, the second pixel, the third pixel, and the first and the second half pixels of the crosstalk detection pixel are respectively a white pixel, a blue pixel, a red pixel, a cyan pixel, and a yellow pixel.

In an embodiment, each subarray has a 3×3 matrix structure. Under this structure, one crosstalk detection pixel is located in the center of the subarray and four white pixels are located at, four corners of the subarray, respectively. Two blue pixels are located between the white pixels arranged in the row direction, and two red pixels are located at both sides of the crosstalk detection pixel along the row direction.

Figure 5:
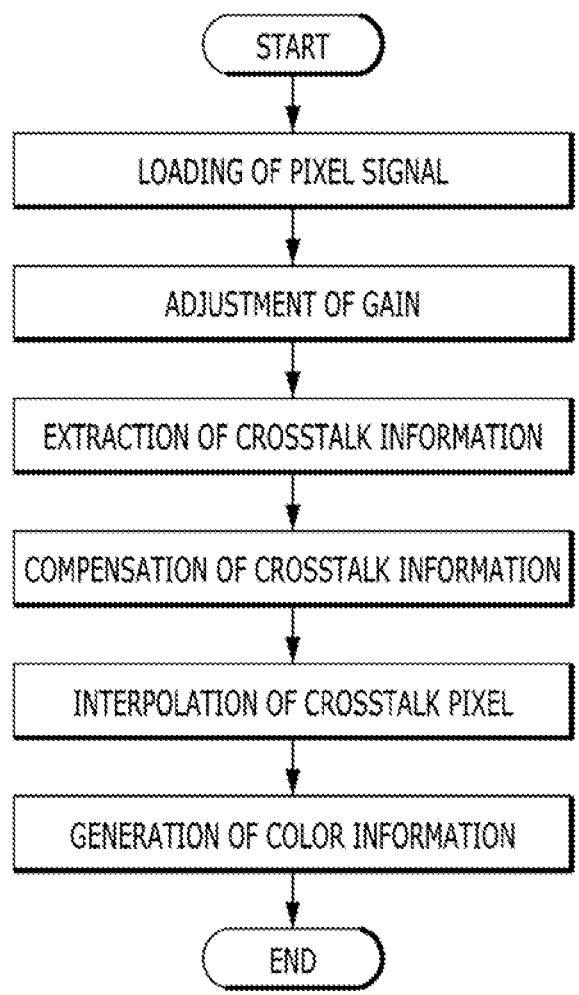
FIG. 5 is a flow chart to illustrate how to obtain color information using a color filter array according to an embodiment.

FIG. 5 is a flow chart to illustrate how to obtain color information using a color filter array according to an embodiment.

First, the signal processing circuit (280 shown in FIG. 2) or the processor (340 shown in FIG. 3) is loaded with pixel signals. The pixel signals may be loaded on the basis of the subarray. That is, pixel signals outputted from more than one subarray are provided to the signal processing circuit or the processor.

Next, each of the first and the second half pixels of the crosstalk detection pixel has a photoelectric conversion element that is smaller than that of the white pixel, the blue pixel, or the red pixel. Thus, output gains from the first and the second half pixels are properly adjusted. That is, intensity of the outputs from the first half pixel and the second half pixel may be amplified.

Next, crosstalk information is extracted from the blue pixel and the red pixel based on the amplified output of the crosstalk detection pixel. The extracted crosstalk information may be used for auto white balance or lens shading correction.

Next, the outputs of the blue pixel and the red pixel are compensated for the extracted crosstalk information. Thereby, color reproducibility may be improved. Next, a white value is estimated from the crosstalk detection pixel using the outputs of the four white pixels which surround the crosstalk detection pixel. That is, the crosstalk detection pixel is interpolated as the white pixel.

Next, a weight value is calculated from difference in brightness between five white pixels (including the four white pixels and the interpolated white pixel), based on an average of the pixel signals corresponding to the five white pixels.

Although various embodiments have been described for illustrative purposes, it will be apparent to those skilled in the art that various changes and modifications may be made without departing from the spirit and scope of the invention as defined in the following claims.

What is claimed is:

1. A color filter array comprising:
   a plurality of first pixels suitable for transmitting light having visible wavelengths;
   a plurality of second pixels suitable for transmitting light having a first range of wavelengths in the visible spectrum;
   a plurality of third pixels suitable for transmitting light having a second range of wavelengths in the visible spectrum; and
   a plurality of crosstalk detection pixels each including a first half pixel and a second half pixel,
   wherein the first half pixel transmits light having first wavelengths that are within the first range, and the second half pixel transmits light having second wavelengths that are within the second range, and
   wherein the first half pixel has higher spectral sensitivity correlation to the plurality of second pixels than the plurality of third pixels, and the second half pixel has higher spectral sensitivity correlation to the plurality of third pixels than the plurality of second pixels,
   wherein the plurality of second pixels have the lowest spectral sensitivity correlation to the plurality of third pixels.

2. The color filter array of claim 1, wherein each of the plurality of crosstalk detection pixels is located adjacent to at least two of the plurality of first pixels, at least two of the plurality of second pixels, and at least two of the plurality of third pixels.

3. The color filter array of claim 1,
   wherein the first wavelengths have a range corresponding to an edge of the first range, and
   wherein the second wavelengths have a range corresponding to an edge of the second range.

4. The color filter array of claim 1, wherein the plurality of first pixels are arranged in a checkerboard pattern.

5. The color filter array of claim 1,
   wherein the plurality of crosstalk detection pixels and the plurality of first pixels are arranged in a diagonal direction and in an alternate manner.

6. The color filter array of claim 1,
   wherein each of the plurality of crosstalk detection pixels is arranged in a different row and column from the plurality of first pixels.

7. The color filter array of claim 1, wherein the sum of the plurality of first pixels and the plurality of crosstalk detection pixels is 40-60% of a total number of pixels.

8. The color filter array of claim 7, wherein the total number of the plurality of first pixels is the same as or greater than the total number of the plurality of crosstalk detection pixels.

9. The color filter array of claim 1,
wherein the plurality of first pixels and the plurality of crosstalk detection pixels are arranged in a given region, and
wherein the plurality of second pixels and the plurality of third pixels are randomly arranged in a region which is not occupied by the plurality of first pixels and the plurality of crosstalk detection pixels.

10. The color filter array of claim 9, wherein the total number of the plurality of second pixels is substantially the same as the total number of the plurality of third pixels.

11. The color filter array of claim 1, wherein each of the plurality of second pixels and the plurality of third pixels includes at least one selected from the group consisting of a red pixel, a green pixel, a blue pixel, a cyan pixel, a yellow pixel, and a magenta pixel.

12. The color filter array of claim 1, wherein the color filter array comprises a plurality of subarrays having a 3×3 matrix structure and includes the respective crosstalk detection pixels in a center thereof.

13. The color filter array of claim 12, wherein the plurality of subarrays each include the plurality of first pixels, the plurality of second pixels, the plurality of third pixels, and the crosstalk detection pixel at a ratio of 4:2:2:1.

14. The color filter array of claim 13, wherein the plurality of subarrays partially shares with each other the first, the second, and the third pixels.

15. The color filter array of claim 13, wherein the subarray includes the first pixels at four corners thereof and includes the second and third pixels at a top and a bottom of the crosstalk detection pixel and at both sides of the crosstalk detection pixel, respectively.

16. The color filter array of claim 1, wherein the first and second half pixels are approximately half of a size of the first to third pixels.

17. A color filter array comprising:
a plurality of first pixels suitable for transmitting light having visible wavelengths;
a plurality of second pixels suitable for transmitting light having a first range of wavelengths in the visible spectrum;
a plurality of third pixels suitable for transmitting light having a second range of wavelengths in the visible spectrum; and
a plurality of crosstalk detection pixels each including a first half pixel and a second half pixel,
wherein the first half pixel transmits light having first wavelengths that are within the first range, and the second half pixel transmits light having second wavelengths that are within the second range, and
wherein the first half pixel has higher spectral sensitivity correlation to the plurality of second pixels than the plurality of third pixels, and the second half pixel has higher spectral sensitivity correlation to the plurality of third pixels than the plurality of second pixels,
wherein the plurality of first pixels includes a white pixel or a transparent pixel,
wherein the plurality of second pixels and the plurality of third pixels include a blue pixel and a red pixel, respectively, and
wherein the first half pixel and the second half pixel include a cyan pixel and a yellow pixel, respectively.

18. A color filter array comprising:
a plurality of first pixels suitable for transmitting light having visible wavelengths;
a plurality of second pixels suitable for transmitting light having a first range of wavelengths in the visible spectrum;
a plurality of third pixels suitable for transmitting light having a second range of wavelengths in the visible spectrum; and
a plurality of crosstalk detection pixels each including a first half pixel and a second half pixel,
wherein the first half pixel transmits light having first wavelengths that are within the first range, and the second half pixel transmits light having second wavelengths that are within the second range, and
wherein the plurality of first pixels includes a white pixel or a transparent pixel, the plurality of second pixels and the plurality of third pixels include a blue pixel and a red pixel, respectively, and the first half pixel and the second half pixel include a cyan pixel and a yellow pixel, respectively.

* * * * *